US012552395B2

(12) United States Patent
Endo et al.

(10) Patent No.: US 12,552,395 B2
(45) Date of Patent: Feb. 17, 2026

(54) DRIVING DIAGNOSIS SYSTEM

(71) Applicant: TOYOTA JIDOSHA KABUSHIKI KAISHA, Toyota (JP)

(72) Inventors: Masato Endo, Nagoya (JP); Motoshi Kojima, Toyota (JP); Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/732,969

(22) Filed: Jun. 4, 2024

(65) Prior Publication Data
US 2025/0091589 A1 Mar. 20, 2025

(30) Foreign Application Priority Data
Sep. 19, 2023 (JP) .................................. 2023-150645

(51) Int. Cl.
| | |
|---|---|
| *B60W 40/09* | (2012.01) |
| *B60W 50/00* | (2006.01) |
| *B60W 50/14* | (2020.01) |
| *G06F 21/60* | (2013.01) |
| *G06F 21/62* | (2013.01) |

(52) U.S. Cl.
CPC ............ *B60W 40/09* (2013.01); *B60W 50/14* (2013.01); *G06F 21/606* (2013.01); *G06F 21/6245* (2013.01); *B60W 2050/0083* (2013.01); *B60W 2050/146* (2013.01); *B60W 2556/45* (2020.02); *G06F 2221/2111* (2013.01)

(58) Field of Classification Search
CPC ...... B60Q 40/09; B60W 50/14; G06F 21/606; G06F 21/6245
See application file for complete search history.

(56) References Cited

U.S. PATENT DOCUMENTS

| | | | | |
|---|---|---|---|---|
| 7,471,999 | B2 * | 12/2008 | Taki ....................... | G07C 5/008 701/32.7 |
| 7,734,287 | B2 * | 6/2010 | Ying ...................... | H04W 84/02 702/183 |
| 8,458,315 | B2 * | 6/2013 | Miche .................. | H04W 4/029 709/224 |
| 9,430,886 | B2 * | 8/2016 | Yano .................... | G07C 5/0808 |
| 10,820,141 | B2 * | 10/2020 | Beaurepaire .......... | G06Q 50/01 |

(Continued)

FOREIGN PATENT DOCUMENTS

| | | |
|---|---|---|
| JP | 2023-085099 A | 6/2023 |
| JP | 2023-085100 A | 6/2023 |

*Primary Examiner* — Hoi C Lau
(74) *Attorney, Agent, or Firm* — SoraIP, Inc.

(57) ABSTRACT

The driving diagnosis system includes a server and a first terminal of a watching target person and a second terminal of a watching target person, and performs a driving diagnosis of the watching target person, wherein the server includes a CPU that performs information processing, and CPU acquires vehicle information, performs a driving diagnosis of the watching target person for a plurality of diagnosis items based on the acquired vehicle information, acquires a disclosable range from the first terminal of the watching target person to the watching person of the respective diagnosis items, extracts diagnosis information included in the disclosable range as watching information, and transmits the extracted watching information to the second terminal of the watching person.

4 Claims, 16 Drawing Sheets

(56) References Cited

U.S. PATENT DOCUMENTS

| | | | |
|---|---|---|---|
| 11,187,545 B2* | 11/2021 | Beaurepaire | G01C 21/20 |
| 11,303,621 B2* | 4/2022 | Beaurepaire | G01C 21/36 |
| 11,438,938 B1* | 9/2022 | Kennedy | H04W 12/08 |
| 11,769,407 B1* | 9/2023 | Kennedy | H04W 4/025 |
| | | | 709/203 |
| 12,090,799 B2* | 9/2024 | Duffy | B60C 23/0479 |
| 2001/0033225 A1* | 10/2001 | Razavi | H04L 67/34 |
| | | | 340/988 |
| 2002/0193925 A1* | 12/2002 | Funkhouser | G07C 5/0808 |
| | | | 701/31.8 |
| 2003/0036832 A1* | 2/2003 | Kokes | G07C 5/008 |
| | | | 701/31.4 |
| 2004/0090346 A1* | 5/2004 | Simonds | B60R 16/0315 |
| | | | 340/905 |
| 2005/0104745 A1* | 5/2005 | Bachelder | G08G 1/01 |
| | | | 340/988 |
| 2006/0033615 A1* | 2/2006 | Nou | G08B 13/19647 |
| | | | 340/506 |
| 2006/0247832 A1* | 11/2006 | Taki | H04L 67/12 |
| | | | 701/31.4 |
| 2008/0125965 A1* | 5/2008 | Carani | G08G 1/13 |
| | | | 340/539.13 |
| 2010/0026476 A1* | 2/2010 | Yamaoka | B60W 50/0098 |
| | | | 340/439 |
| 2013/0167159 A1* | 6/2013 | Ricci | G06F 21/10 |
| | | | 719/319 |
| 2015/0134192 A1* | 5/2015 | Kakinuma | B60W 50/04 |
| | | | 701/31.4 |
| 2016/0297316 A1* | 10/2016 | Penilla | G06Q 30/0232 |
| 2017/0186313 A1* | 6/2017 | Stein | H04L 67/12 |
| 2017/0186324 A1* | 6/2017 | Fish | G07C 5/0816 |
| 2017/0193576 A1* | 7/2017 | Fish | G07C 5/008 |
| 2017/0313322 A1* | 11/2017 | Onorato | B60W 50/0098 |
| 2018/0111494 A1* | 4/2018 | Penilla | G06Q 20/145 |
| 2020/0084193 A1* | 3/2020 | Beaurepaire | G05D 1/0287 |
| 2020/0162836 A1* | 5/2020 | Beaurepaire | G06F 16/9537 |
| 2020/0200561 A1* | 6/2020 | Jin | G01C 21/3629 |
| 2020/0334924 A1* | 10/2020 | Wells | H04L 67/04 |
| 2020/0393847 A1* | 12/2020 | Govindan | G05D 1/0295 |
| 2020/0409929 A1* | 12/2020 | Kodavarti | G06F 16/2365 |
| 2021/0334853 A1* | 10/2021 | Mahrouq | G06Q 30/0241 |
| 2023/0122572 A1* | 4/2023 | Choi | H04W 4/90 |
| | | | 455/404.1 |
| 2023/0174085 A1 | 6/2023 | Endo | |
| 2023/0202246 A1* | 6/2023 | Duffy | B60C 23/0442 |
| | | | 340/447 |
| 2023/0351811 A1* | 11/2023 | Endo | G06F 21/6245 |
| 2023/0401903 A1* | 12/2023 | Endo | G07C 5/0825 |
| 2023/0406337 A1* | 12/2023 | Kamezaki | B60W 40/09 |
| 2024/0185645 A1* | 6/2024 | Joaquin | G07C 5/008 |
| 2024/0249569 A1* | 7/2024 | Akima | G07C 5/0808 |
| 2024/0257530 A1* | 8/2024 | Urayama | B60Q 5/00 |
| 2024/0394666 A1* | 11/2024 | Ishii | G06Q 10/20 |
| 2025/0091589 A1* | 3/2025 | Endo | B60K 35/21 |
| 2025/0256669 A1* | 8/2025 | Murai | B60R 16/037 |

\* cited by examiner

FIG. 4

DIAGNOSTIC CRITERIA DATABASE

| DIAGNOSTIC ITEMS | EVALUATION INDEX | SCORE | | |
|---|---|---|---|---|
| | | 1 | 2 | 3 |
| ACCELERATOR OPERATION | MAXIMUM ACCELERATION | A OR MORE | BETWEEN A AND B | LESS THAN B |
| BRAKE OPERATION | MAXIMUM SPEED | C OR MORE | BETWEEN C AND D | LESS THAN D |
| HANDLE OPERATION | MAXIMUM LATERAL ACCELERATION | E OR MORE | BETWEEN E AND F | LESS THAN F |
| DISTANCE BETWEEN VEHICLES | DISTANCE BETWEEN VEHICLES | SHORT | INTERIM | APPROPRIATE |
| RECOGNITION AND JUDGMENT | APPROACH WARNING | EMERGENCY BRAKING | WARNING | NO WARNING |

DIAGNOSTIC HISTORY DATABASE

PERSONS TO BE WATCHED  AAA

38

| OPERATION SCENE EXTRACTION TIME | YYYY/MM/DD hh/mm | YYYY/MM/DD hh/mm | YYYY/MM/DD hh/mm | ... | YYYY/MM/DD hh/mm |
|---|---|---|---|---|---|
| DRIVING SCENE | START | DECELERATION | TURNING | ... | LANE CHANGE |
| ACCELERATOR OPERATING SCORE | 2 | 3 | 3 | ... | 3 |
| BRAKE OPERATING SCORE | 3 | 2 | 3 | ... | 3 |
| HANDLE OPERATION SCORE | 3 | 3 | 1 | ... | 2 |
| INTER-VEHICLE DISTANCE SCORE | 3 | 2 | 3 | ... | 2 |
| AWARENESS AND JUDGMENT SCORES | 3 | 2 | 3 | ... | 3 |
| NUMBER OF HAZARD AVOIDANCE OPERATIONS | 0 | 0 | 0 | ... | 0 |
| SAFE DRIVING LEVEL | 5 | 3 | 3 | ... | 4 |
| MILEAGE | 100 | 105 | 130 | ... | 500 |
| RUNNING TIME | 10 | 15 | 20 | ... | 100 |

FIG. 6

USER INFORMATION DATABASE

| NAME OF WATCHING TARGET PERSON | AGE | GENDER | OPERATING EXPERIENCE YEARS | WATCHER'S NAME | SAFE DRIVING LEVEL JUDGMENT RESULT | DISCLOSURE RANGE SETTING STATUS ||||
|---|---|---|---|---|---|---|---|---|---|
| | | | | | | MONTHLY OVERALL EVALUATION | MILEAGE | RUNNING TIME | NUMBER OF HAZARD AVOIDANCE OPERATIONS |
| AAA | 70 | MALE | 25 YEARS | aaa | 5 | POSSIBLE | NOT POSSIBLE | NOT POSSIBLE | NOT POSSIBLE |
| BBB | 75 | MALE | 26 YEARS | bbb | 3 | POSSIBLE | POSSIBLE | POSSIBLE | POSSIBLE |
| CCC | 80 | MALE | 20 YEARS | ccc | 4 | POSSIBLE | NOT POSSIBLE | POSSIBLE | POSSIBLE |
| DDD | 72 | MALE | 28 YEARS | ddd | 3 | POSSIBLE | POSSIBLE | POSSIBLE | POSSIBLE |
| EEE | 20 | MALE | 0.1 YEAR | eee | NA | NOT POSSIBLE | NOT POSSIBLE | NOT POSSIBLE | POSSIBLE |

MONTHLY COMPREHENSIVE DISCLOSURE RANGE DATABASE 39A

| NAME OF WATCHING TARGET PERSON | AGE | GENDER | OPERATING EXPERIENCE | WATCHER'S NAME | MONTHLY COMPREHENSIVE EVALUATION AND DISCLOSURE POSSIBLE ITEMS ||||||| 
|---|---|---|---|---|---|---|---|---|---|---|
| | | | | | SAFE DRIVING LEVEL | ACCELERATOR OPERATING SCORE | BRAKE OPERATING SCORE | HANDLE OPERATION SCORE | INTER-VEHICLE DISTANCE SCORE | AWARENESS AND JUDGMENT SCORES |
| AAA | 70 | MALE | 25 YEARS | aaa | NOT POSSIBLE | POSSIBLE | POSSIBLE | POSSIBLE | POSSIBLE | POSSIBLE |
| BBB | 75 | MALE | 26 YEARS | bbb | POSSIBLE | POSSIBLE | POSSIBLE | POSSIBLE | POSSIBLE | POSSIBLE |
| CCC | 80 | MALE | 20 YEARS | ccc | POSSIBLE | NOT POSSIBLE | POSSIBLE | NOT POSSIBLE | NOT POSSIBLE | POSSIBLE |
| DDD | 72 | MALE | 28 YEARS | ddd | POSSIBLE | POSSIBLE | POSSIBLE | POSSIBLE | POSSIBLE | POSSIBLE |
| EEE | 20 | MALE | 1 YEAR | eee | NOT POSSIBLE | NOT POSSIBLE | NOT POSSIBLE | NOT POSSIBLE | NOT POSSIBLE | NOT POSSIBLE |

DRIVING DIAGNOSIS SYSTEM

CROSS-REFERENCE TO RELATED APPLICATION

This application claims priority to Japanese Patent Application No. 2023-150645 filed on Sep. 19, 2023, incorporated herein by reference in its entirety.

BACKGROUND

1. Technical Field

The present disclosure relates to a driving diagnosis system that performs a driving diagnosis of a watching target person.

2. Description of Related Art

In recent years, a driving diagnosis of a driver has been performed. For example, Japanese Unexamined Patent Application Publication No. 2023-85099 (JP 2023-85099 A) discloses that a driving skill as a reference and a newly diagnosed driving skill are compared based on a driving diagnosis and a driving item with a varied driving skill is specified. It is disclosed that a driving item with a varied driving skill and a driving skill corresponding to the driving item are presented to a driver or a watching person.

Meanwhile, Japanese Unexamined Patent Application Publication No. 2023-85100 (JP 2023-85100 A) discloses a method of performing a driving diagnosis of a driver based on vehicle information and giving a benefit corresponding to the result of the driving diagnosis to a beneficiary.

SUMMARY

When the watching target person is highly conscious of privacy, the watching target person may feel anxious about the use of an application that discloses all the diagnosis items and the driving skills to the watching person as described in JP 2023-85099 A.

Therefore, an object of the present disclosure is to provide a driving diagnosis system that can be used by a watching target person without anxiety.

An aspect of the present disclosure provides a driving diagnosis system that includes a driving diagnosis device, a first terminal of a watching target person, and a second terminal of a watching person, and that performs a driving diagnosis of the watching target person, in which:
the driving diagnosis device includes a processor that processes information; and
the processor is configured to
acquire vehicle information,
perform a driving diagnosis of the watching target person for a plurality of diagnostic items based on the acquired vehicle information,
acquire a disclosable range of each of the diagnostic items from the first terminal of the watching target person to the watching person,
extract diagnostic information included in the disclosable range as watching information, and
transmit the extracted watching information to the second terminal of the watching person.

In this manner, the watching target person can set the disclosable range to the watching person by himself/herself, and thus even a watching target person that is highly conscious of privacy can use the driving diagnosis system without anxiety.

In the driving diagnosis system according to the present disclosure, the first terminal of the watching target person may display a plurality of profiles associated with a content of the diagnostic items or each of the diagnostic items; and a content of the diagnostic items or each of the diagnostic items associated with a profile selected by the watching target person may be transmitted to the driving diagnosis device as the disclosable range to the watching person.

Thus, the watching target person can easily transmit the disclosable range to the driving diagnosis device.

In the driving diagnosis system according to the present disclosure, a plurality of disclosable ranges may be set according to a plurality of levels of privacy.

Thus, the watching target person can easily transmit the disclosable range to the driving diagnosis device according to the privacy level.

In the driving diagnosis system according to the present disclosure, a plurality of profiles may be set according to a scene of use of a vehicle.

Thus, the watching target person can easily transmit the disclosable range to the driving diagnosis device according to the scene of use of the vehicle.

In the driving diagnosis system according to the present disclosure, the driving diagnosis device may determine a safe driving level of the watching target person, and transmit the safe driving level to the first terminal of the watching target person; and the first terminal of the watching target person may restrict the profile that is selectable by the watching target person based on the received safe driving level.

Thus, it is rendered possible to select a profile having a high privacy level with less disclosure items when the safe driving level is high, and it is not rendered possible to select a profile having a high privacy level when the safe driving level is low, for example. Therefore, an appropriate profile can be selected according to the safe driving level of the watching target person.

The present disclosure can provide a driving diagnosis system that can be used by a watching target person without anxiety.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing the structure of the diagnostic criteria database of the server shown in FIG. 3;

FIG. 5 is a diagram showing the structure of the diagnosis history database shown in FIG. 3;

FIG. 6 is a diagram showing the structure of the user information database shown in FIG. 3;

FIG. 7 is a diagram showing the structure of the monthly comprehensive evaluation disclosure possible range database shown in FIG. 3;

DETAILED DESCRIPTION OF EMBODIMENTS

Figure 1:
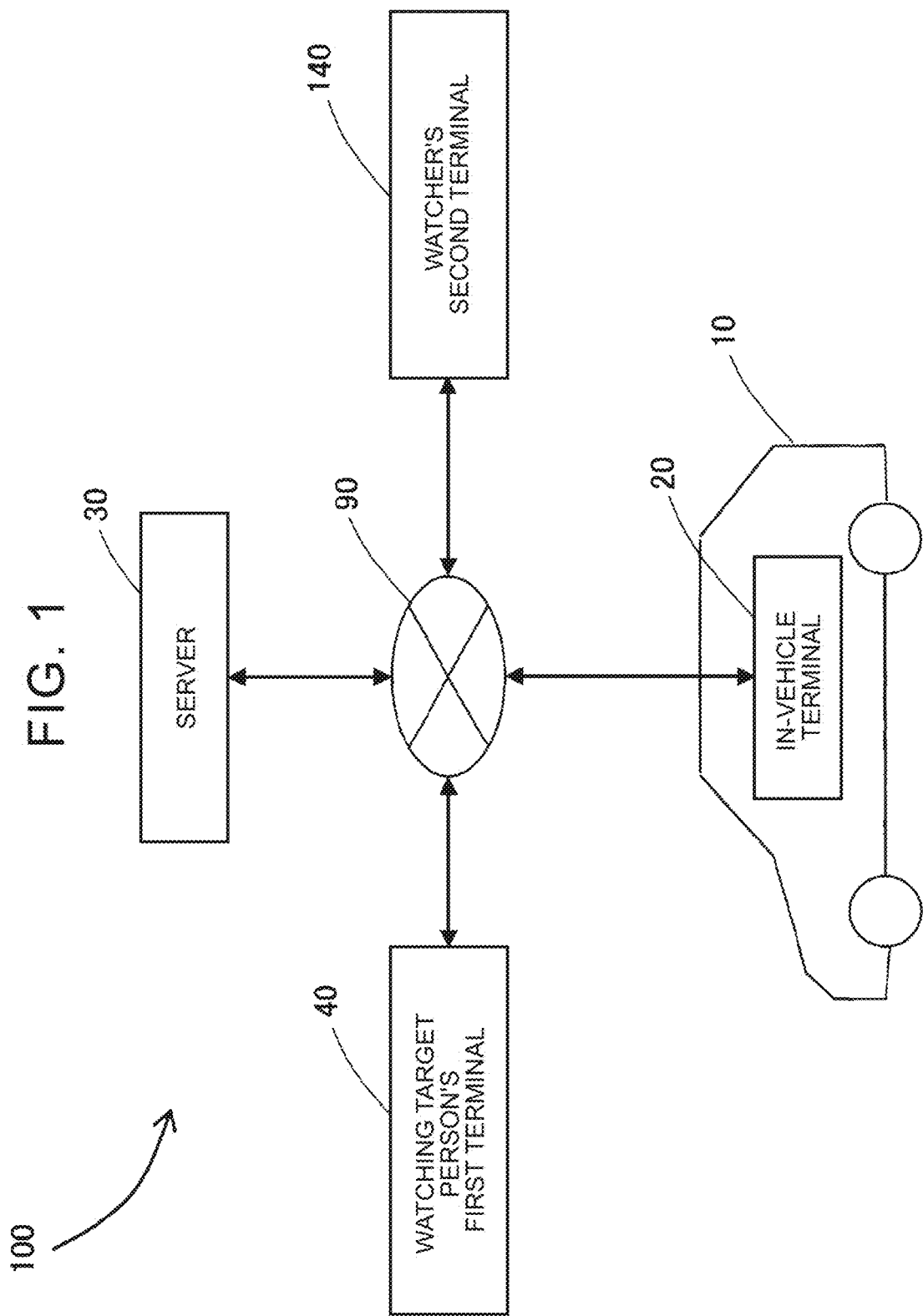
FIG. 1 is a system diagram illustrating an overall configuration of a driving diagnosis system according to an embodiment.

Hereinafter, the driving diagnosis system 100 according to the embodiment will be described with reference to the drawings. As illustrated in FIG. 1, the driving diagnosis system 100 includes a vehicle 10, a server 30 that is a driving diagnosis device, a first terminal 40 that is a portable terminal of a watching target person, and a second terminal 140 that is a portable terminal of a watching person. An in-vehicle terminal 20 is mounted on the vehicle 10. The in-vehicle terminal 20, the server 30, the first terminal 40, and the second terminal 140 are connected to each other through a network 90. In FIG. 1, one vehicle 10, one in-vehicle terminal 20, one first terminal 40, and one second terminal 140 are connected to one server 30. However, the number of the vehicle 10, the in-vehicle terminal 20, the first terminal 40, and the second terminal 140 is not limited to this, and may be two or more.

Figure 2:
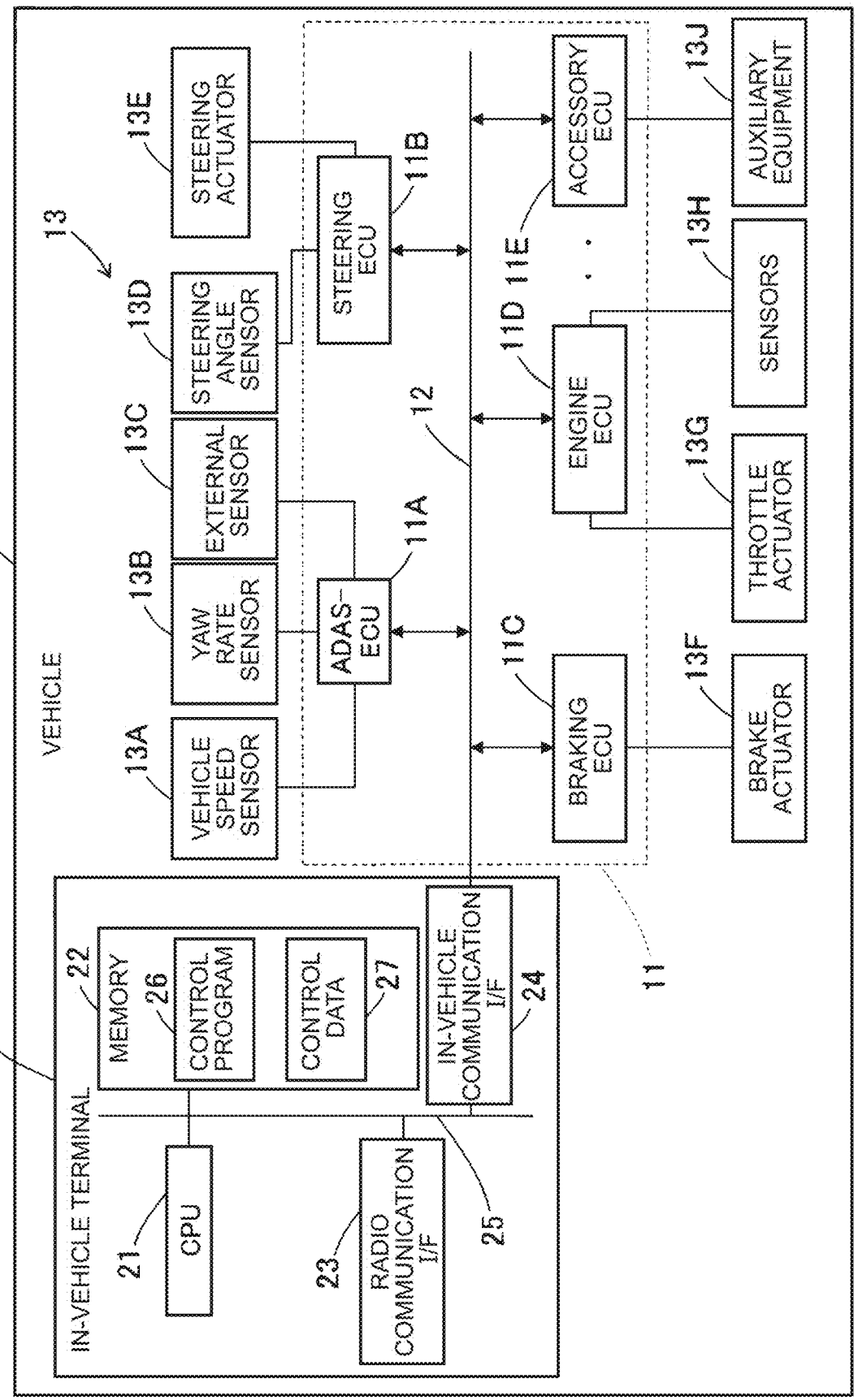
FIG. 2 is a system diagram showing a hardware configuration of the vehicle shown in FIG. 1.

As illustrated in FIG. 2, the vehicle 10 includes a plurality of Electronic Control Units (ECUs) 11, a plurality of in-vehicle devices 13, and an in-vehicle terminal 20.

ECU 11 includes an Advanced Driver Assistance System-ECU (ADAS-ECU) 11A, a steering ECU 11B, a braking ECU 11C, an engine ECU 11D, and an auxiliary ECU 11E. ADAS-ECU 11A, the steering ECU 11B, the braking ECU 11C, the engine ECU 11D, and the accessory ECU 11E are connected to each other by a bus 12 to exchange data with each other. The vehicles 10 may include other ECU.

ADAS-ECU 11A performs overall control of the advanced driving support system. A vehicle speed sensor 13A, a yaw rate sensor 13B, and an external sensor 13C that constitute the in-vehicle device 13 are connected to ADAS-ECU 11A. The external sensor 13C is a sensor group used for detecting the surrounding environment of the vehicle 10. The external sensor 13C includes, for example, a camera that captures an image of the surroundings of the vehicle 10, a millimeter wave radar that transmits a probe wave and receives a reflected wave, a lidar that scans the front of the vehicle 10, and the like.

The steering ECU 11B controls the power steering. A steering angle sensor 13D and a steering actuator 13E constituting the in-vehicle device 13 are connected to the steering ECU 11B. The steering angle sensor 13D is a sensor for detecting a steering angle of the steering wheel. The steering actuator 13E steers the steered wheels of the vehicles 10 in response to the driver's manipulation.

The brake ECU 11C controls the brake system of the vehicle 10. A brake actuator 13F constituting the in-vehicle device 13 is connected to the brake ECU 11C. The brake actuator 13F drives the brake of the vehicle 10 in response to the driver's manipulation.

The engine ECU 11D controls the engine of the vehicle 10. The throttle actuator 13G and the sensors 13H constituting the in-vehicle device 13 are connected to the engine ECU 11D. The throttle actuator 13G is configured to drive a throttle of the engine in response to an operation of the driver. The sensor 13H includes, for example, an oil temperature sensor for measuring the oil temperature of the engine oil, a hydraulic pressure sensor for measuring the oil pressure of the engine oil, and a rotational sensor for detecting the rotational speed of the engine.

As illustrated in FIG. 2, the in-vehicle terminal 20 is a computer including a CPU 21, memories 22, a wireless communication interface 23, and an in-vehicle communication interface 24. CPU 21, the memories 22, the wireless communication interface 23, and the in-vehicle communication interface 24 are connected to each other by an internal bus 25.

CPU 21 is a processor that performs information processing. The memory 22 stores a control program 26 and control data for executing the control program 26. CPU 21 implements various control operations by executing the control program 26 stored in the memory 22.

The in-vehicle communication interface 24 is connected to the bus 12 of the vehicle 10. Vehicle data related to the status and control of the vehicle 10 is collected from ADAS-ECU 11A, the steering ECU 11B, the braking ECU 11C, the engine ECU 11D, and the auxiliary ECU 11E of the vehicle 10 via the bus 12 according to CAN protocol.

The wireless communication interface 23 is a wireless communication module connected to the network 90 for communicating with the server 30.

Figure 3:
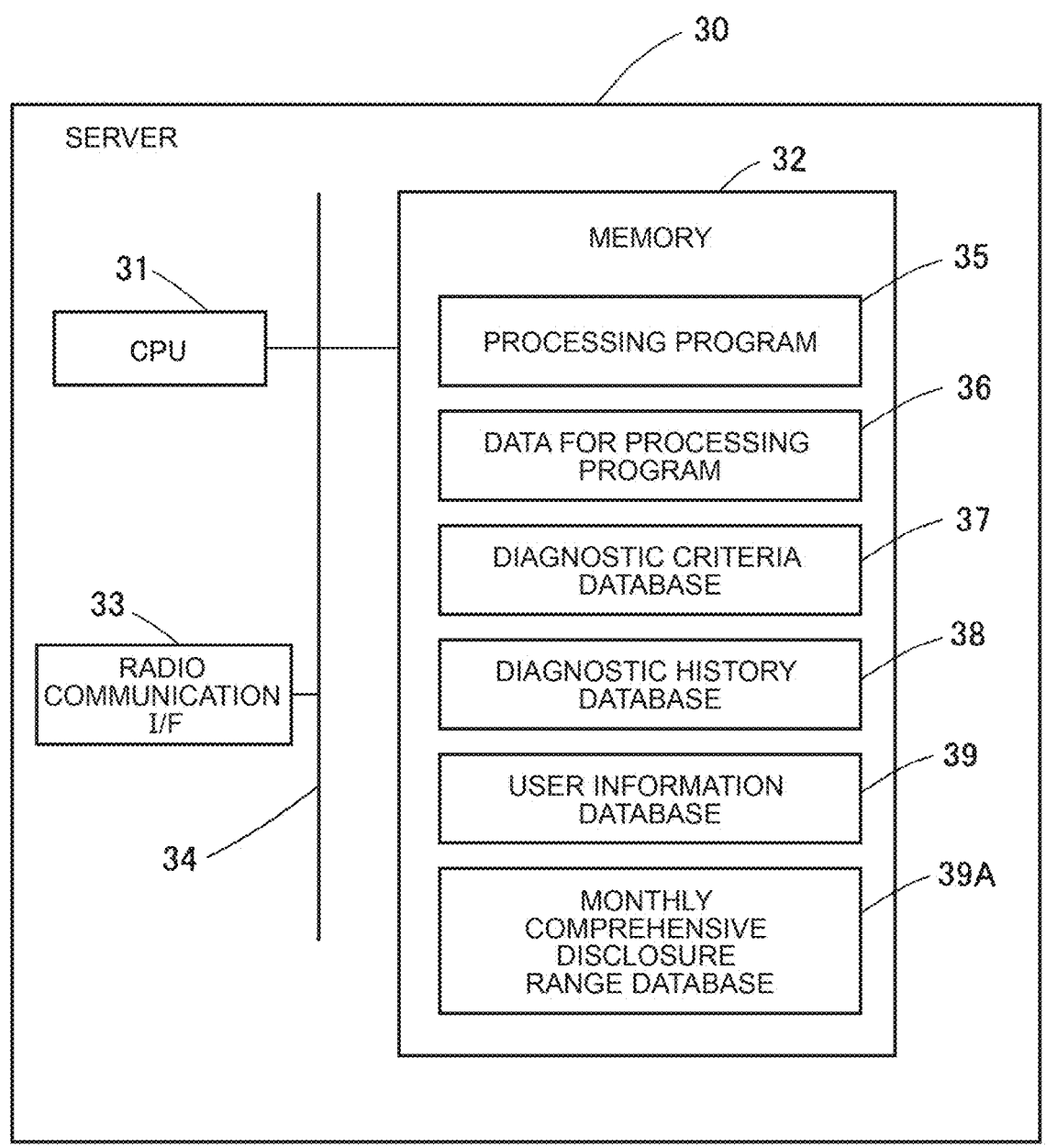
FIG. 3 is a system diagram showing a hardware configuration of the server shown in FIG. 1.

As illustrated in FIG. 3, the servers 30 are computers that include a CPU 31 that is a processor that performs information processing, a memory 32 that stores data, and a wireless communication interface 33. CPU 31, the memories 32, and the wireless communication interface 33 are connected to each other by an internal bus 34. The wireless communication interface 33 is a wireless communication module connected to the network 90 for communicating with the in-vehicle terminal 20, the first terminal 40, and the second terminal 140.

The memory 32 stores a processing program 35, processing program data 36, a diagnostic criteria database 37, a diagnostic history database 38, a user information database 39, and a monthly total assessment disclosable scope database 39A. Note that other programs and databases may be stored in the memory 32.

The processing program 35 includes a driving diagnosis program for performing driving diagnosis of a driver of the vehicle 10 and a watching information extraction program for extracting the diagnosis information included in the disclosable range as watching information. The processing program 35 is executed by CPU 31. The processing program data 36 temporarily stores data when CPU 31 executes the processing program 35, and also stores setting values and the like required to execute the processing program 35. The operation of the servers 30 is realized by CPU 31 executing the processing program 35.

As illustrated in FIG. 4, the diagnostic criteria database 37 is a database in which the evaluation indices of the respective diagnostic items when CPU 31 executes the driving diagnosis and the reference values of the scores are stored in association with each other. In the diagnostic criteria database 37, when the diagnostic item is an accelerator operation, the maximum acceleration is defined to be used as an evaluation index. Further, in the diagnostic criteria database 37, it is defined that the maximum acceleration is equal to or greater than A as a reference value with an accelerator operation score of 1, and that the maximum acceleration is less than B as a reference value with an accelerator operation score of 3. The maximum acceleration is defined to be a reference value with a score of 2 between A and B as the accelerator operation score. Incidentally, the numerical value of the score indicates that the level of safe driving is higher as the score is larger.

Similarly, in the diagnostic criteria database 37, when the diagnosis item is a brake operation, the maximum deceleration is used as an evaluation index, and the maximum deceleration is defined as a reference value with a score of the brake operation equal to or greater than C as 1. It is defined that the maximum deceleration is less than D as a reference value with a brake operation score of 3, and that the maximum deceleration is intermediate between C and D as a reference value with a brake operation score of 2. In addition, in the diagnostic criteria database 37, when the diagnostic item is a handle operation, it is specified that the maximum lateral acceleration is used as the evaluation index. It is defined that the maximum lateral acceleration is equal to or greater than E and a reference value having a handle operation score of 1, the maximum lateral acceleration is less than F as a reference value having a handle operation score of 3, and the middle of the maximum lateral acceleration is E and F as a reference value having a handle operation score of 2. In addition, in the diagnostic criteria database 37, when the diagnosis item is the inter-vehicle distance, the long and short inter-vehicle distances are defined as the criteria of the score of the inter-vehicle distance. In the case where the diagnosis item is cognition/judgment, it is stipulated that an approach warning is used as an evaluation index, the operation of the emergency brake is used as a criterion of a score of 1 for recognition/judgment, that there is no warning is used as a criterion of a score of 3, and that when there is a warning is used as a criterion of a score of 2.

As illustrated in FIG. 5, the diagnostic history database 38 is a database in which items of a driving scene extraction time, a driving scene, an accelerator operation score, a brake operation score, a steering wheel operation score, an inter-vehicle distance score, a recognition/determination score, a danger avoidance operation count, a safe driving level, a traveling distance, and a traveling time are stored for each registered watching target person stored in the user information database 39. Here, the driving scene includes a start, an acceleration, a deceleration, a stop, a turn, a lane change, a merging, a parking, and the like. The accelerations, stops, merges, and parking are not shown.

As illustrated in FIG. 6, the user information database 39 is a database in which the watching target person name, the age of the watching target person, the sex, the number of years of driving experience, the watching person name, the safety driving level determination result, and the disclosable range setting state are stored in association with each other. The watching target person is, for example, an elderly person such as a DDD from the watching target AAA, and ddd from the watching person aaa is often the child, but is not limited thereto. For example, the watch target may be a child with a license set up like an EEE, and the watch target may be its parent eee.

Here, the safe driving level determination result stores, for example, the safety driving level for the latest month. As in the case of the watching target EEE, when the driving experience-years are short and the determination of the safe driving level for the month is not performed, the character "NA" is stored. The disclosable range setting state stores whether or not the monitoring target person can disclose the monthly total evaluation, the traveling distance, the traveling time, and the number of times of danger avoidance set by the first terminal 40 to the second terminal 140.

As shown in FIG. 7, the monthly total assessment disclosable scope database 39A stores whether or not the watcher can disclose the safety driving level, the accelerator operation score, the braking operation score, the steering wheel operation score, the inter-vehicle distance score, and the cognitive/judgment score during the monthly total evaluation set by the first terminal 40 to the second terminal 140.

Here, the traveling distance, the traveling time, the number of times of danger avoidance, the safe driving level, the accelerator operation score, the brake operation score, the steering wheel operation score, the inter-vehicle distance score, and the recognition/determination score constitute diagnosis information of the result of the driving diagnosis.

Figure 8:
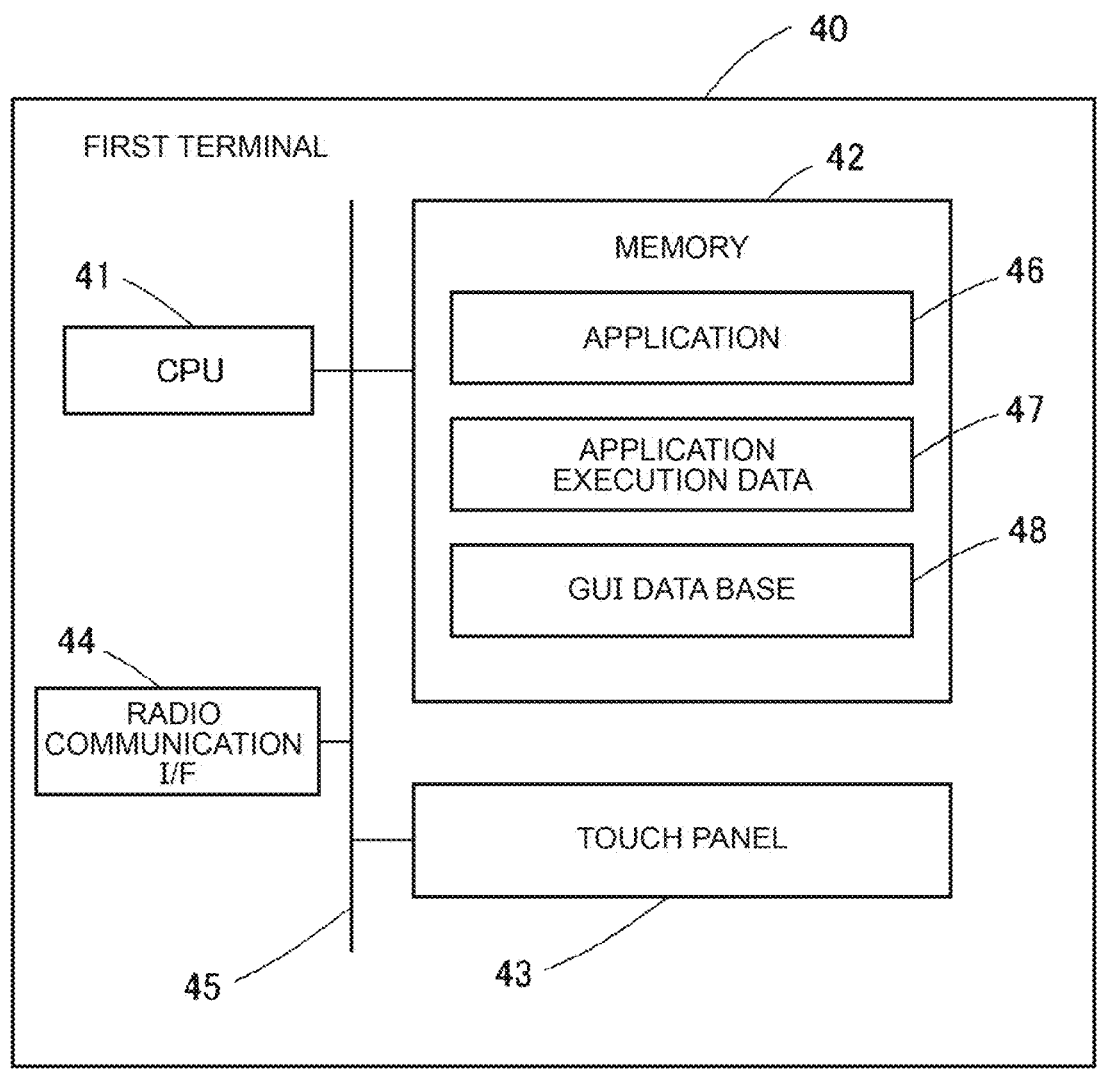
FIG. 8 is a system diagram showing a hardware configuration of the first terminal shown in FIG. 1.

As illustrated in FIG. 8, the first terminal 40, which is a mobile terminal of a watching target person, is a smartphone including a CPU 41 that is a processor that performs information processing, a memory 42 that stores data, a touch panel 43 that displays and inputs information, and a radio communication interface 44. CPU 41, the memories 42, the touch panel 43, and the radio communication interface 44 are connected by an internal bus 45. The operation of the first terminal 40 is realized by CPU 41 executing the application 46.

In the memory 42, an application 46 for performing driving diagnostics, application executing data 47, and a GUI database 48 are stored. The application execution data 47 temporarily stores data when CPU 41 executes the application 46, and also stores setting values and the like required to execute the application 46.

GUI data base 48 stores image data of a top screen 51 displayed on the touch panel 43 as shown in FIGS. 9 to 12, a disclosable range initial setting screen 53, a monthly total evaluation disclosable range setting screen 54, and a second and subsequent setting screen 55 for a disclosure range.

Figure 9:
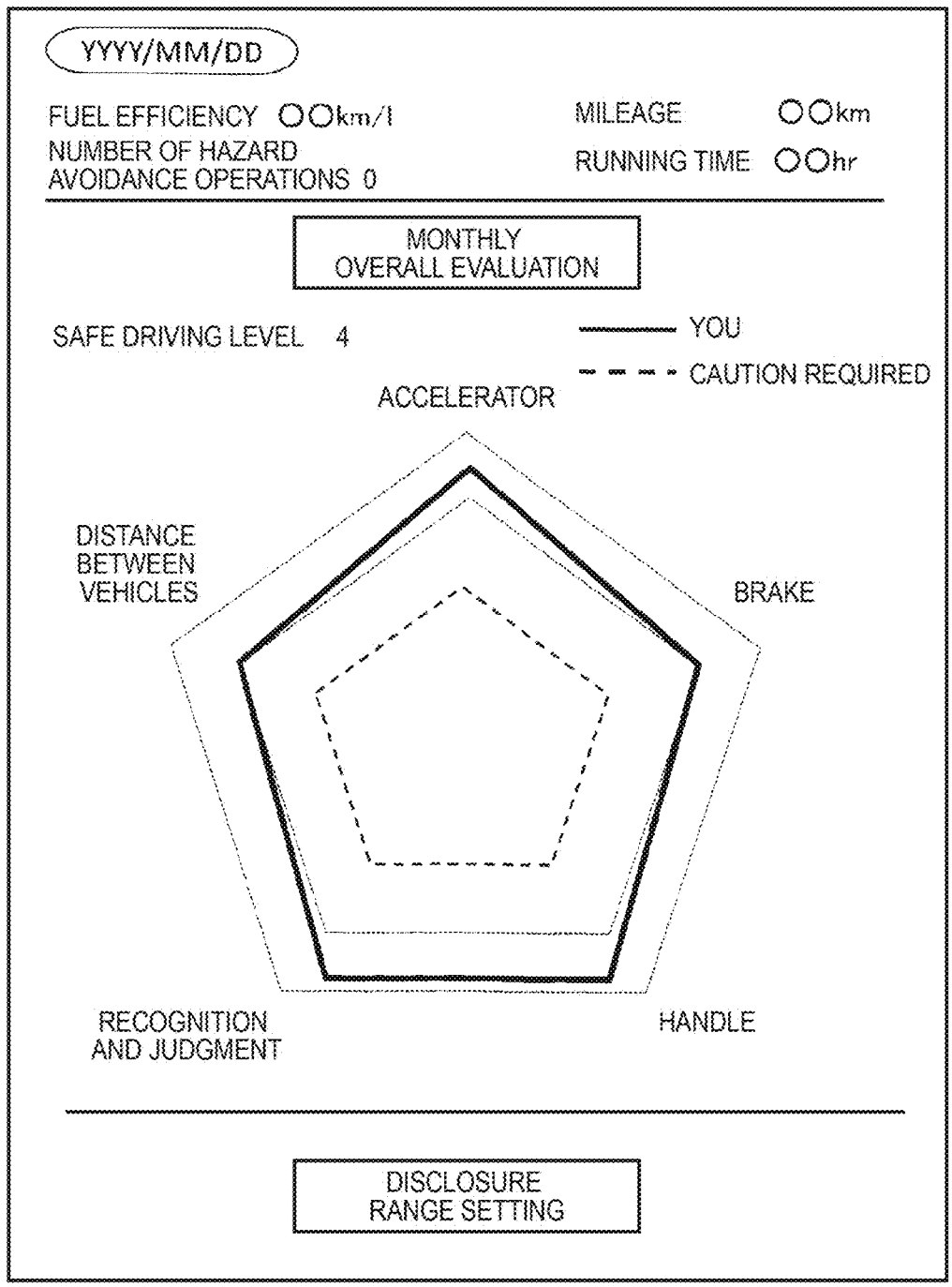
FIG. 9 is a diagram showing a top-screen stored in GUI data base shown in FIG. 8.

As illustrated in FIG. 9, the top screen 51 is a screen displayed when the application 46 for performing driving diagnosis is executed. On the top screen 51, the display date and time, the fuel consumption, the number of danger avoidance operations, the travel distance, the travel time, and the monthly total evaluation are displayed. In the monthly total evaluation, the scores of the safety driving level, the accelerator operation, the brake operation, the steering wheel operation, the inter-vehicle distance, and the recognition/determination items are displayed. The score of each item is displayed in a graph. As described above, the traveling distance, the traveling time, the number of times of danger avoidance, the safe driving level, the accelerator operation score, the brake operation score, the steering wheel operation score, the inter-vehicle distance score, and the recognition/judgment score constitute the diagnosis information of the result of the driving diagnosis. The disclosable range initial setting screen 53, the monthly total evaluation disclosable range setting screen 54, and the second and subsequent setting screens 55 of the disclosable range will be described later together with the description of the operation.

The hardware configuration of the second terminal 140 of the watcher is the same as the hardware configuration of the first terminal 40 described with reference to FIG. 8. However, since the second terminal 140 does not enter the disclosable area, GUI data base 48 stores the image data of the top screen 51 shown in FIG. 9. However, the disclosable range initial setting screen 53, the monthly total evaluation disclosable range setting screen 54, and the second and subsequent setting screens 55 of the disclosable range are not stored.

Next, the operation of the driving diagnosis system 100 according to the embodiment will be described with reference to FIGS. 13 to 16.

Figure 13:
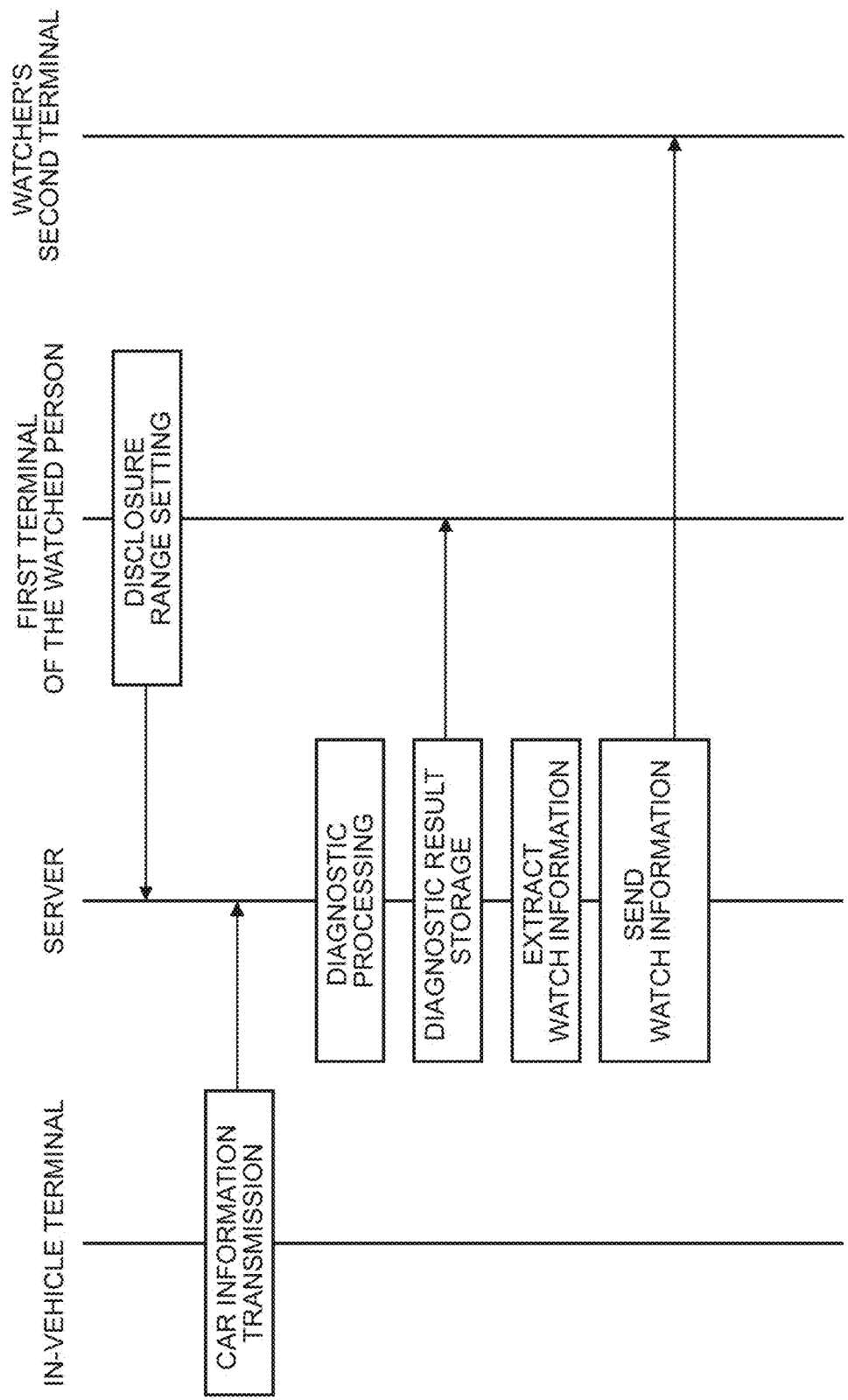
FIG. 13 is a sequence diagram illustrating the overall operation of the driving diagnosis system according to the embodiment.

As illustrated in FIG. 13, in the driving diagnosis system 100, the diagnosis information that the watching target person can disclose to the watching person from the first terminal 40 is registered in the user information database 39 of the server 30 and the monthly total assessment disclosable scope database 39A. The server 30 receives the vehicle information from the in-vehicle terminal 20 mounted on the vehicle 10, executes the driving diagnosis process of the watching target person based on the received vehicle information, stores the diagnosis information in the diagnostic history database 38, and transmits the diagnosis information to the first terminal 40 of the watching target person. In addition, the server 30 refers to the user information database 39 and the monthly total assessment disclosable scope database 39A, extracts the diagnostic information included in the disclosable range as the watching information, and transmits the extracted watching information to the second terminal 140 of the watcher.

Hereinafter, the operation of the driving diagnosis system 100 will be described in detail with reference to the flowcharts of FIGS. 14 to 16.

Figure 10:
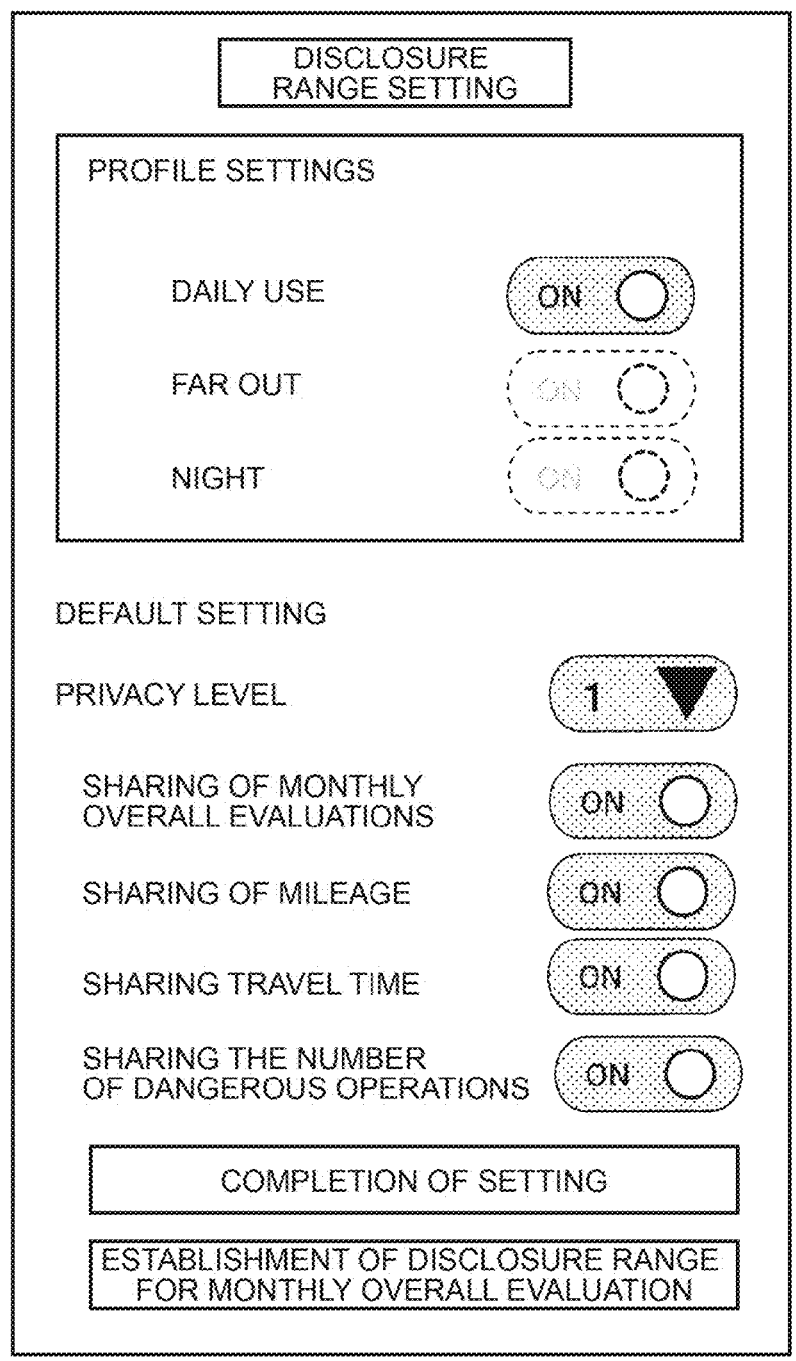
FIG. 10 is a diagram showing a disclosable range initialization window stored in GUI data base shown in FIG. 8.

First, a disclosable range setting operation of the first terminal 40 will be described with reference to FIG. 14. CPU 41 of the first terminal 40 executes an application 46 for performing driving diagnostics stored in the memories 42. As shown in step 101 of FIG. 14, CPU 41 determines whether to initialize the disclosable area. If CPU 41 determines YES in step 101 of FIG. 1, the process proceeds to step 102 of FIG. 1, and the disclosable range initial setting screen 53 shown in FIG. 10 is displayed on the touch panel 43 by referring to GUI data base 48. As illustrated in FIG. 10, a plurality of profiles corresponding to the usage scene of the vehicle 10 are displayed on the disclosable range initial setting screen 53, such as "daily use", "far out", and "night".

Figure 14:
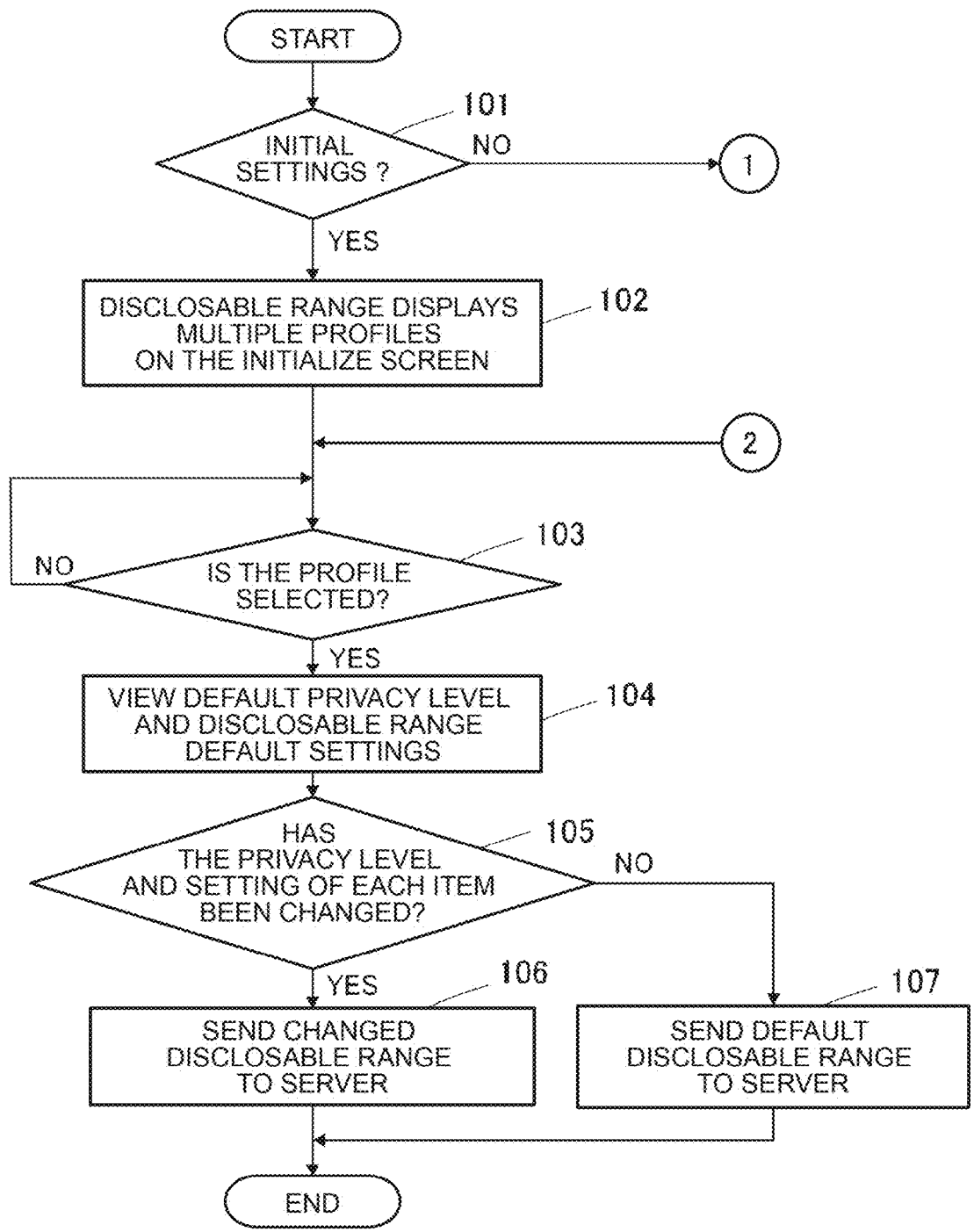
FIG. 14 is a flowchart showing an operation of the first terminal shown in FIG. 1.

As shown in step 103 of FIG. 14, the watching target person operates the touch panel 43 to set one of the plurality of profiles to "ON" and select the profile. As a result, CPU 41 displays the default privacy level and the default settings for sharing the respective items with the observer in the lower part of the display, as shown in step 104 of FIG. 14. In the example illustrated in FIG. 10, the default privacy level is 1, and a screen on which sharing with a watcher for each item of monthly overall evaluation, travel distance, travel time, and number of times of danger avoidance is turned on is displayed. That is, in the default setting, the privacy level is set to the lowest, and all items are set to be disclosable to the watcher.

Figure 12:
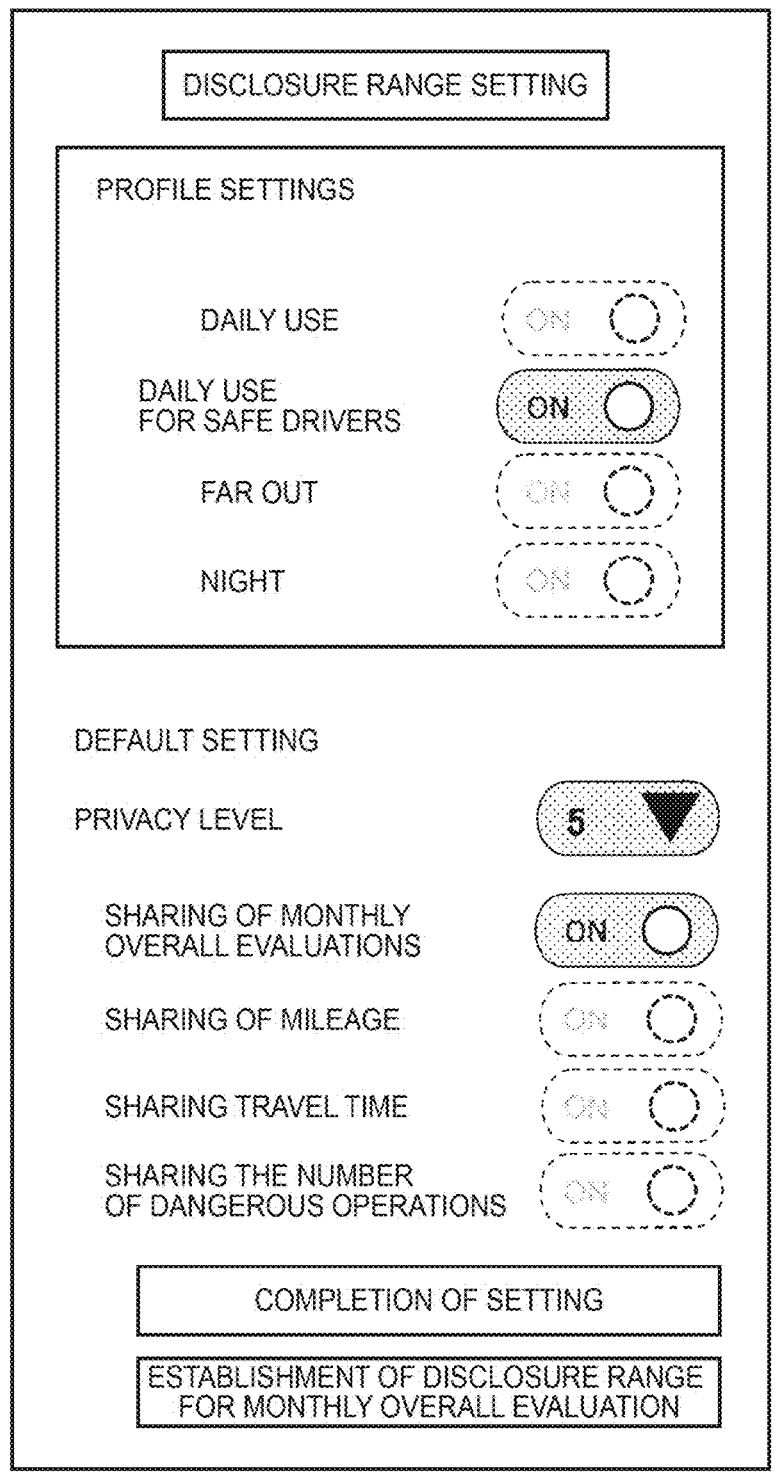
FIG. 12 is a diagram showing the second and subsequent setting screens of the disclosable scope stored in GUI data base shown in FIG. 8.

The watching target person can change the privacy level by pressing the down arrow button next to the privacy level. When the privacy level is changed, the default settings for sharing each item with the observer are displayed according to the changed privacy level. For example, when the privacy level is changed to 5, as shown in FIG. 12, a screen is displayed in which the monthly overall evaluation is switched on and the sharing with the watcher is switched off for other items. The watching target person can freely change the setting of on and off of sharing with the watcher for each displayed item.

When the watching target person ends the change of the disclosable range and presses the setting end button, the information of the changed disclosable range displayed on the screen is transmitted to the server 30 as shown in step 106 of FIG. 14. The server 30 stores the received information on the disclosable range in the user information database 39 shown in FIG. 6. When the watching target person presses the setting end button without changing the setting of the disclosable range from the defaults, CPU 41 determines NO in step 105 of FIG. 14 and proceeds to step 107 of FIG. 14. Then, the default disclosable range is transmitted to the server 30.

Figure 11:
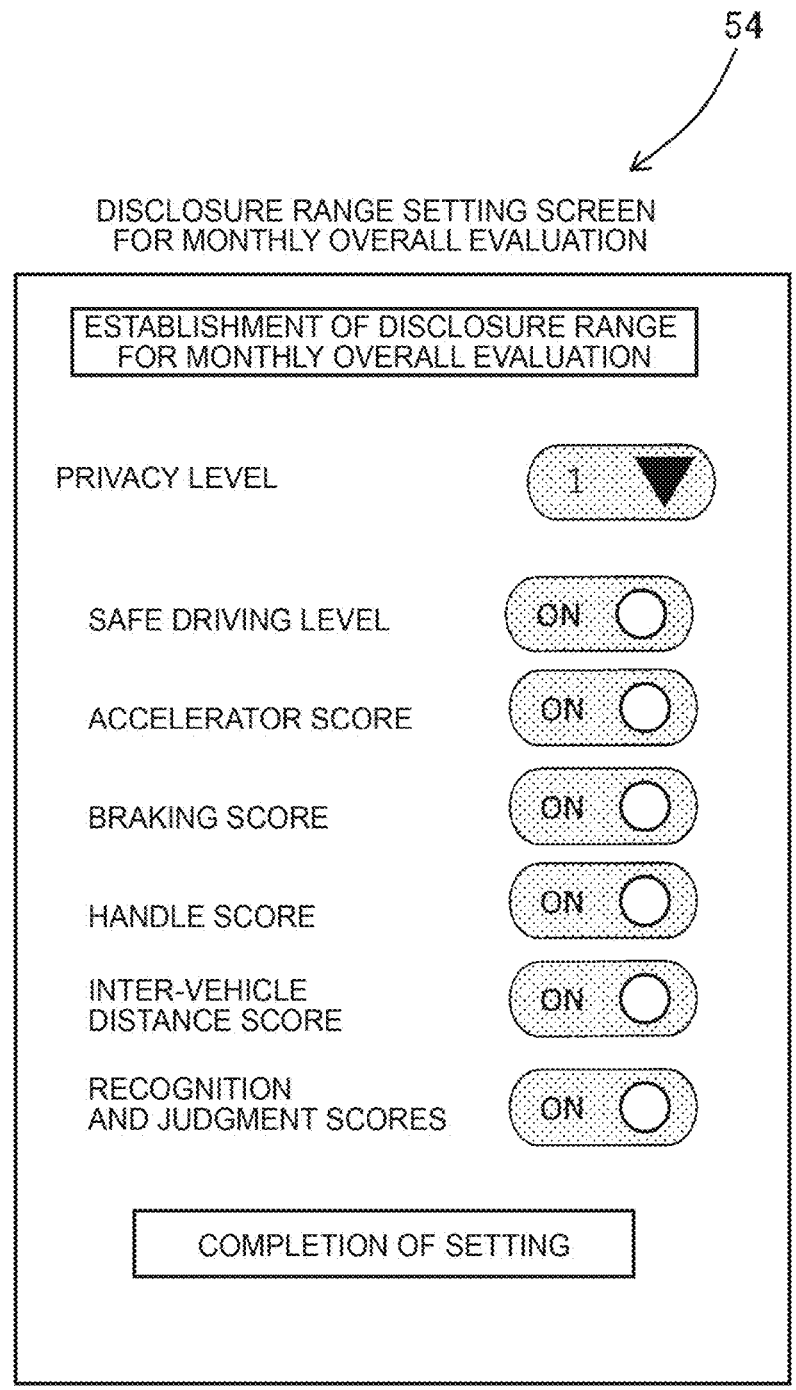
FIG. 11 is a diagram showing a disclosable scope setting window for monthly overall assessment stored in GUI data base shown in FIG. 8.

Further, when the watching target person presses "Disclosable Range Setting of Monthly Comprehensive Evaluation" at the bottom of the screen shown in FIG. 9, CPU 41 refers to GUI data base 48 and displays the monthly total evaluation disclosable range setting screen 54 as shown in FIG. 11 on the touch panel 43. Similar to the disclosable range initial setting screen 53 described above, the default privacy level and the default settings for sharing the safety driving level, the accelerator score, the brake score, the steering wheel score, the inter-vehicle distance score, and the cognitive/judgement score with the observer of each item are displayed. The watching target person can freely change the settings of the privacy level on the touch panel 43 and the sharing with the watcher for each displayed item. Then, when the setting end button is pressed, the information on the disclosure range of the monthly total evaluation after the change displayed on the screen is transmitted to the server 30. The server 30 stores the received information on the disclosure range of the monthly total evaluation in the monthly total assessment disclosable scope database 39A shown in FIG. 7.

Figure 15:
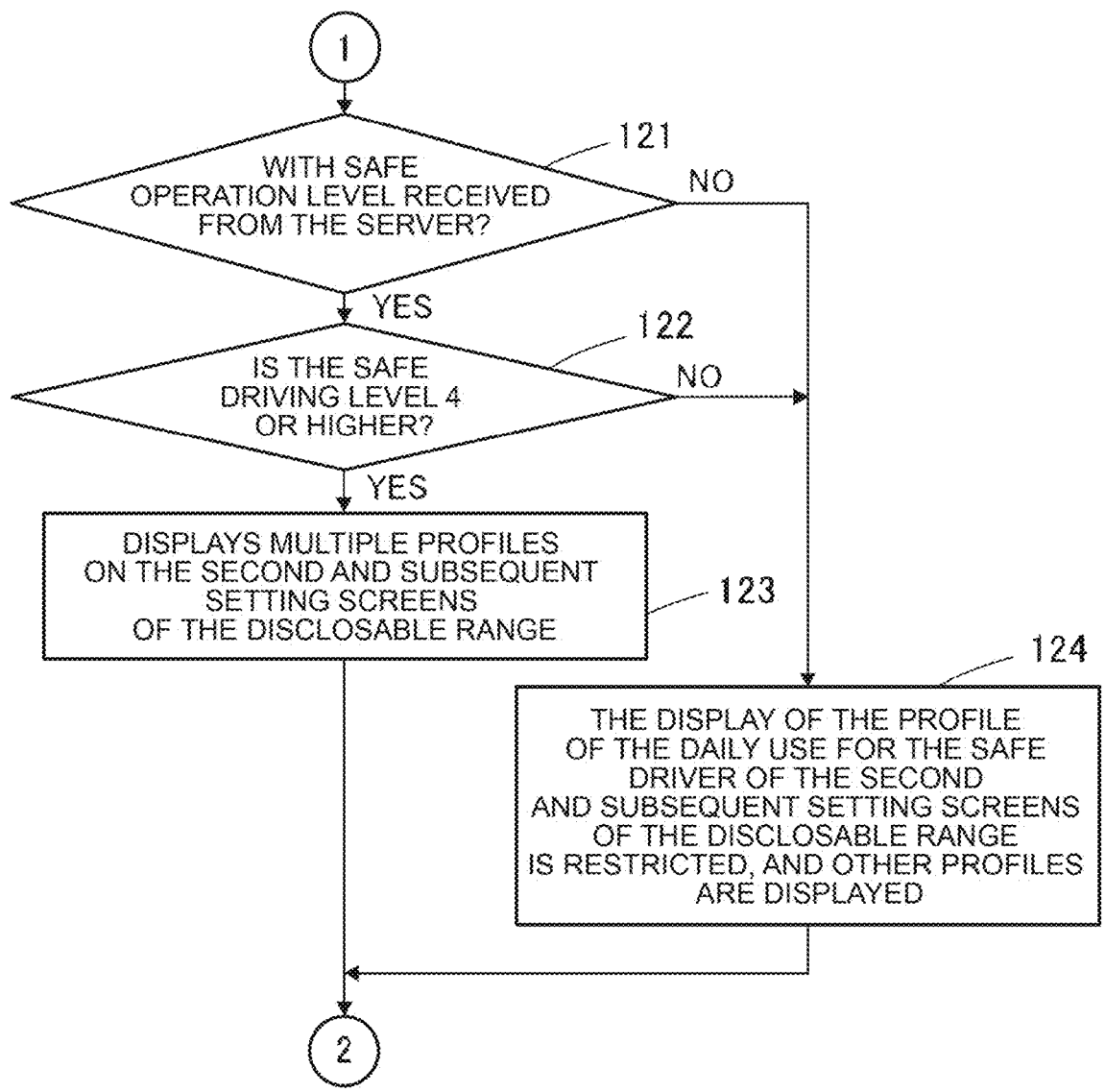
FIG. 15 is a continuation of the flow chart shown in FIG. 14.

Further, when CPU 41 determines NO in step 101 of FIG. 14, that is, when the watching target person sets the second and subsequent disclosures, the process proceeds to step 121 of FIG. 15 to determine whether the safe driving level is received from the servers 30. If CPU 41 determines YES in step 121 of FIG. 15, it proceeds to step 122 of FIG. 15 to determine whether the safe driving level is equal to or greater than 4. Then, when CPU 41 determines that both of step 121 and step 122 in FIG. 15 are YES, the process proceeds to step 123 in FIG. 15, and the second and subsequent setting screens 55 of the disclosable area as shown in FIG. 12 are displayed. In the second and subsequent setting screens 55 of the disclosable range, the profile of "daily use for safe driver" is additionally displayed in the area of the setting by the profile. Then, the default privacy level is set to 5, and the sharing with the watcher of the monthly overall evaluation is turned on, and the default setting in which the sharing with the watcher of the other item is turned off is displayed.

On the other hand, when CPU 41 determines NO in either step 121 or step 122 of FIG. 15, the process proceeds to step 124 of FIG. 15, and the display of the profile of "daily use for safe driver" shown in FIG. 12 is restricted, and three profiles of "daily use", "far out", and "night" are displayed.

After displaying the profile in step 123 or step 124 of FIG. 15, CPU 41 proceeds to step 103 of FIG. 14 and transmits the information of the disclosable scope changed by the watched person to the servers 30. The server 30 stores the information in the user information database 39.

Next, the operation of the server 30 will be described with reference to FIG. 16. When the driving diagnosis system 100 operates, the in-vehicle terminal 20 mounted on the vehicle 10 acquires vehicle information from the plurality of in-vehicle devices 13 via the plurality of ECU 11 and transmits the vehicle information to the servers 30. CPU 31 receives the vehicle data from the in-vehicle terminal 20 in step 201 of FIG. 16. The vehicle information includes the speed of the vehicle 10, the yaw rate, information on the surrounding environment of the vehicle 10, steering angle information of steering, brake operation information, engine operation information, and the like. Further, the vehicle information includes information on the fuel efficiency of the vehicle 10, the travel distance, and the travel time.

CPU 31 executes the diagnostic program in the processing program 35. In step 202 of FIG. 16, CPU 31 extracts the driving scenario of the vehicle 10 based on the vehicle data received from the in-vehicle terminal 20. Driving scenes include, for example, starting, accelerating, decelerating, stopping, turning, lane changing, merging, parking, etc. The driving scene defines a period during which the driving diagnosis is performed.

Figure 16:
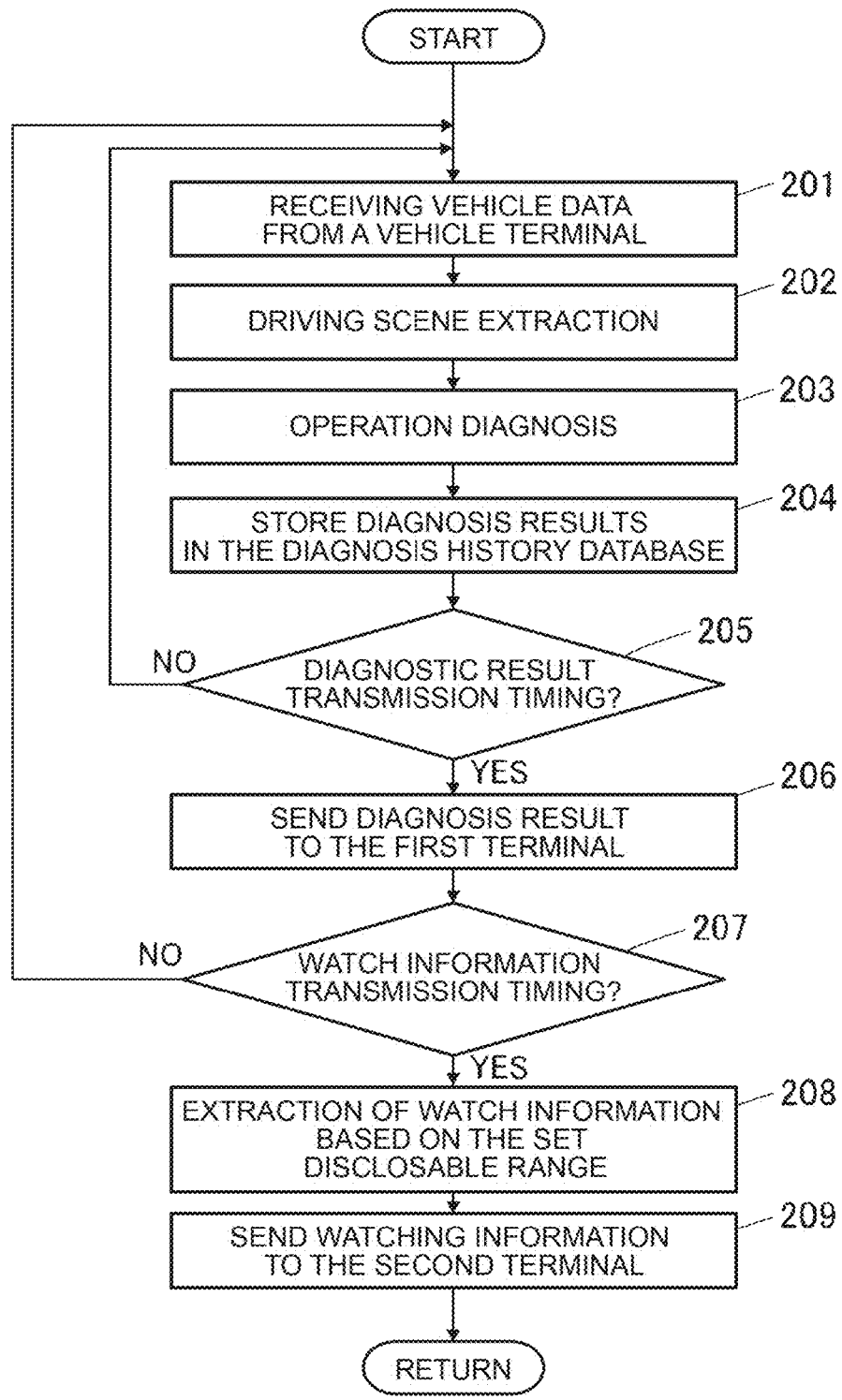
FIG. 16 is a flowchart illustrating an operation of the server illustrated in FIG. 1.

In step 203 of FIG. 16, CPU 31 refers to the diagnostic criteria database 37 shown in FIG. 4, and executes the driving diagnosis of the watching target person who is the driver during the extracted driving scene. As shown in FIG. 4, CPU 31 extracts the presence of the maximum acceleration, maximum deceleration, maximum horizontal acceleration, distance between vehicles, and proximity warning from the vehicle information during the driving scene. With reference to the diagnostic criteria database 37, the respective scores of accelerator operation, brake operation, steering wheel operation, inter-vehicle distance, and recognition/determination are calculated as diagnostic results. In addition, for example, when sudden braking is applied or when sudden steering operation is extracted, CPU 31 counts the number of times that a danger avoidance operation is performed to obtain a diagnosis. Then, CPU 31 calculates the safety driving level of the watching target person in the driving scene on the basis of the calculated scores and the number of times of the danger avoidance operation. Then, in step 204 of FIG. 16, CPU 31 stores the scores of the respective driving operations extracted in step 204 of FIG. 16, the number of times of the danger avoidance operation, the calculated safe driving level, the traveling distance to the extracting time of the driving scene, and the traveling time as diagnostic information in the diagnostic history database 38.

In step 205 of FIG. 16, CPU 31 determines whether to transmit the diagnostic data to the watching target person. For example, when the monthly total evaluation as shown in FIG. 9 is transmitted to the watching target person, the transmission timing is a predetermined date and time at the end of the month. If CPU 31 determines YES in step 205 of FIG. 16, the process proceeds to step 206 of FIG. 16 to transmit the diagnostic data to the first terminal 40 of the watching target person. To the first terminal 40, the diagnosis information of all the items stored in the diagnostic history database 38 in FIG. 16 and the fuel consumption information of the vehicle 10 are transmitted.

When the diagnosis information and the fuel consumption information are transmitted from the server 30, the first terminal 40 stores the transmitted information in the memory 42. Then, when the watching target person activates the driving diagnostic application 46 of the first terminal 40, CPU 41 displays the top screen 51 shown in FIG. 9 on the touch panel 43, reads the information from the memory 42, and displays the information on the screen.

Next, CPU 31 executes the watch-information extracting program included in the processing program 35. In step 207 of FIG. 16, CPU 31 determines whether or not the watcher is timed to transmit the watching data. The transmission timing may be the same timing as the timing at which the diagnosis information or the like is transmitted to the watching target person.

If CPU 31 determines YES in step 207 of FIG. 16, the process proceeds to step 208 of FIG. 16. Referring to the user information database 39 shown in FIG. 6 and the monthly total assessment disclosable scope database 39A shown in FIG. 7, the diagnostic information of the respective items that can be disclosed to the watcher is extracted as the watching information. For example, in the case of the watching target AAA, it is impossible to disclose the traveling distance, the traveling time, and the number of danger avoidance operations, and it is impossible to disclose the safe driving level during the monthly comprehensive assessment. Therefore, CPU 31 extracts the access operation score, the brake operation score, the steering wheel operation score, the inter-vehicle distance score, and the recognition/judgment score during the monthly total assessment as the watch information.

Then, CPU 31 proceeds to step 209 of FIG. 16, and transmits the extracted watching information to the second terminal 140 of the watcher.

The watcher's second terminal 140 stores information received from the server 30 in the memory 42. Then, when the watcher activates the driving diagnostic application 46 of the second terminal 140, CPU 41 displays the top screen 51 shown in FIG. 9 on the touch panel 43, reads the watching information received from the memory 42, and displays the watching information on the screen. When the watcher is aaa, the date of the display, the fuel consumption data, and the monthly overall assessment excluding the safe driving level are displayed on the top screen 51.

As described above, the driving diagnosis system 100 sets diagnosis information that the watching target person can disclose at the watcher's second terminal 140 by the first terminal 40. The server 30 extracts items included in the disclosable range from the diagnosis information of the result of the driving diagnosis as watching information, and displays the items as watching information on the second terminal 140 of the watcher. Therefore, the driving diagnosis system 100 can be used without anxiety even by a person who has a high privacy consciousness and who is to be watched.

Further, in the driving diagnosis system 100, the first terminal 40 of the watching target person displays a plurality of profiles associated with the contents of the plurality of diagnosis items or the respective diagnosis items. The content of the plurality of diagnosis items or each diagnosis item associated with the profile selected by the watching target person is transmitted to the server 30 as a disclosable range to the watching person. Then, the server 30 stores the information of the disclosable range transmitted from the first terminal 40 in the user information database 39 or the monthly total assessment disclosable scope database 39A. Further, a plurality of profiles is set corresponding to use scenes of the vehicle 10. Further, the disclosable range is set corresponding to a plurality of levels of privacy.

Thus, the monitoring target person can easily transmit the disclosable range to the server 30, and can easily set the disclosable range according to the privacy level. In addition, the watching target person can easily set the disclosable range according to the use scene of the vehicle 10.

Further, since the first terminal 40 restricts the profile selectable by the watching target person based on the received safe driving level, the watching target person can select an appropriate profile according to the safe driving level to set the disclosable range. In addition, when the safe driving level is increased, a disclosable range with a high privacy level is displayed by default, so that a motivation that the watching target person attaches importance to the safe driving is generated.

In the above explanation, CPU 31 of the servers 30 executes steps 201 to 203 in FIG. 16, but the present disclosure is not limited thereto. For example, the diagnostic program in the processing program 35 and the diagnostic criteria database 37 may be stored in the memory 22 of the in-vehicle terminal 20, and CPU 21 may perform the driving diagnosis by referring to the diagnostic criteria database 37, and transmit the diagnostic information of the diagnosis result to the server 30. Then, CPU 31 of the servers 30 executes the processes from step 204 to step 209 in FIG. 16. In this case, the in-vehicle terminal 20 and the server 30 constitute a driving diagnosis device.

Further, in the above description, the second terminal 140 of the watcher does not input the disclosable range. Although the disclosable range initial setting screen 53, the monthly total evaluation disclosable range setting screen 54, and the second and subsequent setting screens 55 of the disclosable range are not stored, the present disclosure is not limited thereto. For example, the second terminal 140 may store, in GUI data base 48, a disclosable range initial setting screen 53, a monthly total evaluation disclosable range setting screen 54, and a second and subsequent setting screen 55 for a disclosure range so that a disclosure range can be entered. When the watcher inputs the disclosable range, when the watcher approves the input content, the input content may be stored in the user information database 39 and the monthly total assessment disclosable scope database 39A of the server 30.

Further, in the above explanation, CPU 31 has been described by referring to the diagnostic criteria database 37 to perform the driving diagnosis, but the present disclosure is not limited thereto. For example, CPU 31 may perform driving diagnostics using maps or functions.

What is claimed is:

1. A driving diagnosis system comprising a driving diagnosis device, a first terminal of a watching target person, and a second terminal of a watching person, and configured to perform a driving diagnosis of the watching target person, wherein:
    the driving diagnosis device includes a first processor that processes information;
    the first processor is configured to
        acquire vehicle information,
        perform a driving diagnosis of the watching target person for a plurality of diagnostic items based on the acquired vehicle information,
        acquire a disclosable range of each of the plurality of diagnostic items to the watching person from the first terminal of the watching target person,
        extract diagnostic information included in the disclosable range as watching information, and
        transmit the extracted watching information to the second terminal of the watching person;
    the first terminal includes a second processor;
    the second processor is configured to
        cause a display of the first terminal to display a plurality of profiles associated with a content of the plurality of diagnostic items or each of the plurality of diagnostic items, and p2 transmit the content of the plurality of diagnostic items or each of the plurality of diagnostic items associated with a profile selected by the watching target person to the driving diagnosis device as the disclosable range to the watching person.

2. The driving diagnosis system according to claim 1, wherein the disclosable range is set according to a plurality of levels of privacy.

3. The driving diagnosis system according to claim 1, wherein a plurality of profiles is set according to a scene of use of a vehicle.

4. The driving diagnosis system according to claim 1, wherein:
    the first processor is further configured to
        determine a safe driving level of the watching target person, and
        transmit the safe driving level to the first terminal of the watching target person; and
    the second processor is configured to restrict the profile that is selectable by the watching target person based on the safe driving level received from the driving diagnosis device.

* * * * *